United States Patent [19]

Wood et al.

[11] Patent Number: 5,131,262

[45] Date of Patent: Jul. 21, 1992

[54] APPARATUS FOR DETECTING LEAKS IN FUEL DISPENSING SYSTEMS

[76] Inventors: Lawrence C. Wood, 8301 Boat Club Rd. #626, Fort Worth, Tex. 76179; Dick A. Gann, 5000 Sun Valley Dr., Forth Worth, Tex. 76119

[21] Appl. No.: 694,642

[22] Filed: May 2, 1991

[51] Int. Cl.⁵ ............................................. G01M 3/28
[52] U.S. Cl. .............................................. 73/40.50 R
[58] Field of Search ............ 73/40.5 R, 40; 340/605; 222/52

[56] References Cited

U.S. PATENT DOCUMENTS

| | | | |
|---|---|---|---|
| 3,183,723 | 5/1965 | Deters | 73/40.5 R |
| 3,454,195 | 7/1969 | Deters | 73/40.5 R X |
| 3,940,020 | 2/1976 | McCrory et al. | 73/40.5 R X |
| 4,679,587 | 7/1987 | Jarr | 73/40.5 R X |
| 4,821,559 | 4/1989 | Pupora | 73/40.5 R |
| 5,014,543 | 5/1991 | Franklin et al. | 73/40.5 R |
| 5,042,290 | 8/1991 | Geisinger | 73/40 X |

Primary Examiner—Hezron E. Williams
Assistant Examiner—Joseph W. Roskos
Attorney, Agent, or Firm—James E. Bradley

[57] ABSTRACT

A method and system for detecting leakage in a liquid dispensing system utilizes a diverter. The liquid dispensing system has an underground tank, submersible pump, a control housing and a surface mounted dispenser. The diverter mounts in the control housing, separating the outlet chamber of the control housing into an upstream portion and a downstream portion. The diverter has a diverting passage that diverts fluid flow up through the diverter and back out into the flow line leading to the dispenser. A valve mounts in the diverting passage. One pressure gage mounts on one side of the valve and another pressure gage mounts on the other side of the valve. Closing the valve after the pump has applied pressure to the system will allow pressure drop to be monitored to determine if the leakage exists on one side or the other.

8 Claims, 2 Drawing Sheets

APPARATUS FOR DETECTING LEAKS IN FUEL DISPENSING SYSTEMS

BACKGROUND OF THE INVENTION

1. Field of the Invention

This invention relates in general to a method and apparatus for detecting leaks in fuel dispensing systems utilizing underground storage tanks, and in particular to a valve and pressure monitoring system for isolating the flow line leading to the dispenser from the remaining portions of the control housing for the submersible pump system.

2. Description of the Prior Art

Gasoline stations utilize underground storage tanks for containing gasoline and diesel fuel. A submersible pump will by submersed in the fuel tank. Conduit leads from the pump to a control housing mounted above the fuel tank, but still below the ground. The control housing contains a number of elements for controlling the pumping of the fuel. A check valve is part of these elements. The check valve separates an inlet chamber in the housing from an outlet chamber. The outlet chamber leads to a flow line, which leads to the dispensing unit on the surface.

When dispensing fuel, the dispenser will turn the pump on. The pump will apply a pressure of about 30 PSI to the control housing and flow line. When the pump turns off, the check valve closes. The check valve will cause the line pressure to bleed off to about 6-12 PSI. If it bleeds off any more than that, there will be a malfunction or leak in the system. The leak could be from a malfunction in the check valve, the siphon valve, the functional element or from other portions of the control housing. Or, there could be a leak in the flow line leading to the dispenser.

Some control housings have leak detectors mounted to them. The leak detector mounts in a receptacle located in the outlet chamber of the control housing downstream from the check valve. The leak detector is a pressure monitoring device. If the pressure in the outlet chamber drops below a minimum level, then it will provide a signal to disable the system from further operation until the leak is detected.

Determining the location of the leak can be a problem. The leak could be in the flow line, or it could be in the control housing. The prior art leak detector will not indicate where the leak is occurring. This involves replacing parts in some cases that do not need replacing.

SUMMARY OF THE INVENTION

In this invention, a diverter is provided for insertion into the control housing in the event of a suspected leak. The diverter has a body that will locate within a receptacle provided in the control housing. The body of the diverter has a diverting passage that leads up through the diverter and back down. The inlet of the passage communicates with an upstream portion of the outlet chamber in the housing. The outlet communicates with a downstream portion of the outlet chamber. A valve is mounted to the diverter. The valve can open and close the diverting passage.

An upstream pressure gage connects to the diverting passage upstream of the valve. A downstream pressure gage connects to the diverting passage downstream of the valve.

In use, after installing the diverter, the pump will be actuated to pressurize the system. Then, the diverter valve is closed and the pump turned off. The pressure on the upstream portion of the valve will be monitoring portions of the control housing, including the check valve. The downstream pressure gage will monitor pressure primarily in the flow line leading to the dispensing unit. If leakage occurs in one or the other sides, the pressure will drop below a minimum. This indicates on which side of the diverter that the leak is occurring.

DETAILED DESCRIPTION OF THE INVENTION

Figure 1:
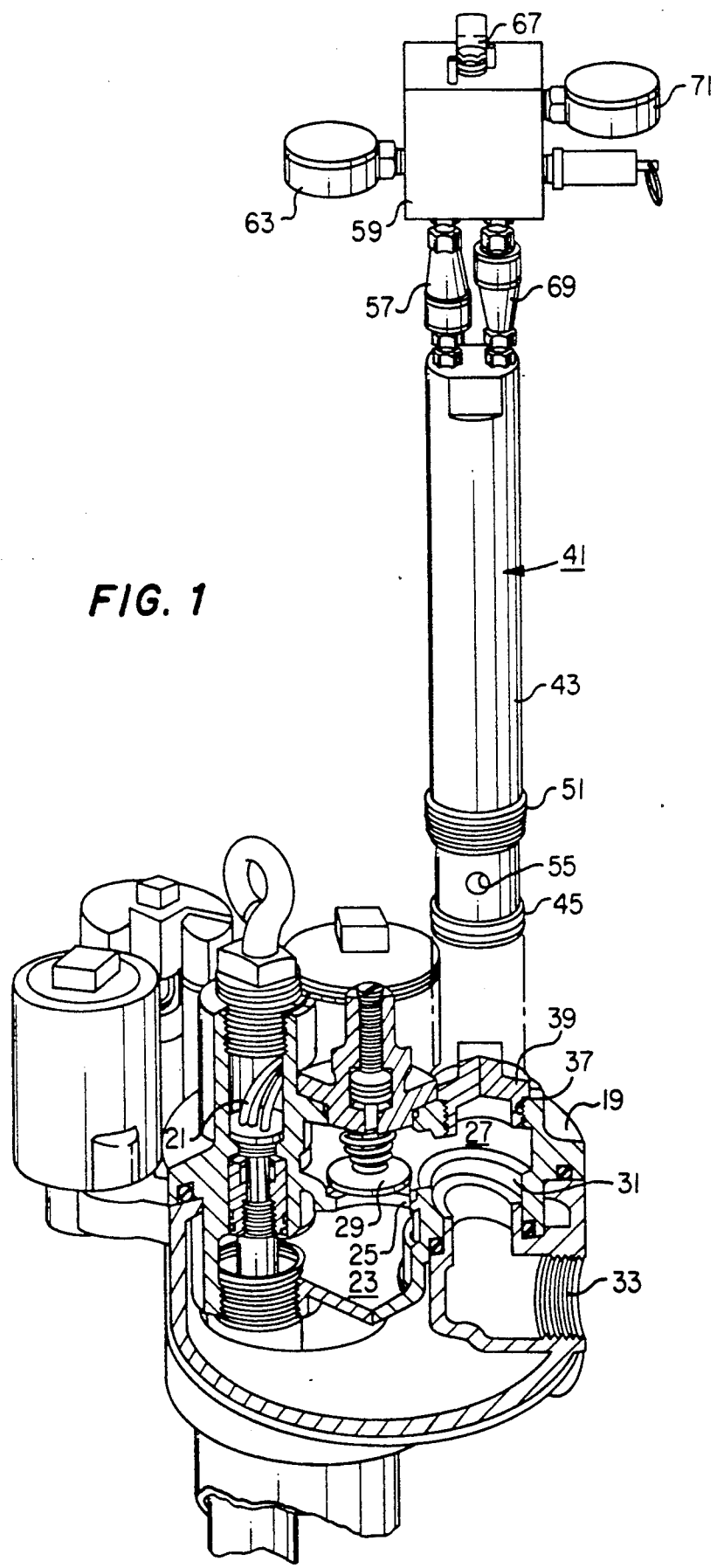
FIG. 1 is a partial perspective view illustrating a conventional control housing for a submersible pump fuel system, and a diverter constructed in accordance with this invention and adapted to be used with the control housing.

Referring to FIG. 1, the fuel dispensing system will have an underground tank 11. Tank 11 contains a fuel 13 such as gasoline or diesel. A submersible pump, schematically illustrated by the numeral 15, will be submersed in the fuel 13. Pump 15 leads through a conduit 17 to a control housing 19.

Control housing 19, as shown also in FIG. 1, is a conventional apparatus. It secures to the upper side of tank 11, but will normally be located below the ground. Control housing 19 contains a number of conventional elements for controlling the flow of fuel. An electrical conduit 21 extends through the control housing 19 for supplying power to pump 15.

Control housing 19 has an inlet chamber 23 where the fluid being pumped initially flows as indicated by the arrow. The fuel flows from the inlet chamber 23 through a check valve port 25 into an outlet chamber 27. When pump 15 operates, check valve 29 will open port 25 to allow fluid to flow into the outlet chamber 27. When the pump 15 stops, check valve 29 closes to prevent backflow of fuel from outlet chamber 27 back into inlet chamber 23. Check valve 29 is designed to allow bleed off from pump pressure to pressure of about 6-12 PSI.

Figure 2:
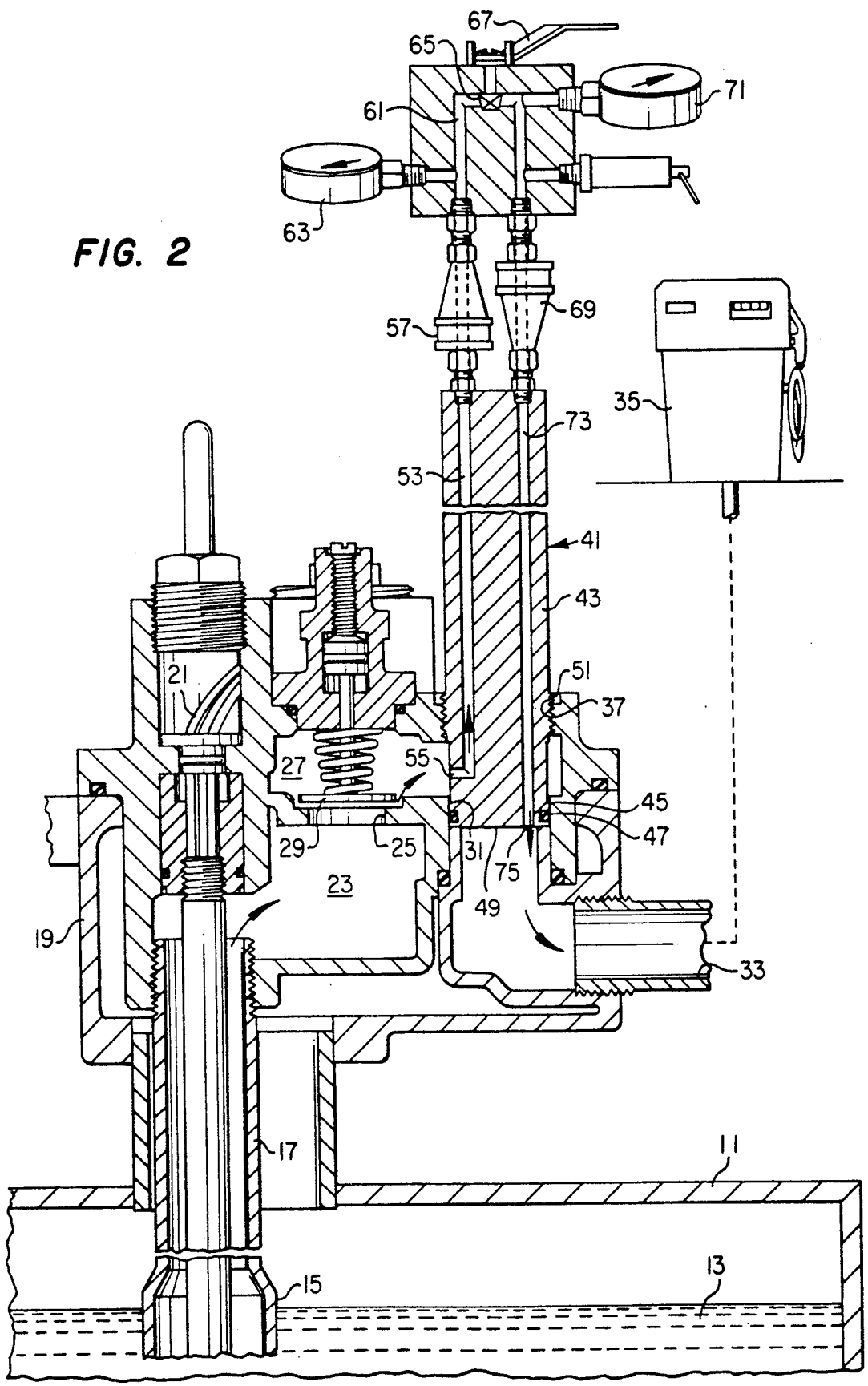
FIG. 2 is a vertical sectional view of the control housing and diverter of FIG. 1, showing the diverter installed, and showing other portions of the fuel dispensing system.

The outlet chamber 27 has on one side a receptacle or seat 31. Receptacle 31 is a cylindrical port that has an axis that faces vertically if the control housing 19 is mounted upward facing as shown in FIG. 1 and FIG. 2. The fluid flows from the outlet chamber 27 down through the receptacle 31 and into a flow line 33. Flow line 33 leads to a conventional dispensing unit 35.

The housing 19 has a threaded aperture 37 located directly above the receptacle 31. As shown in FIG. 1, a closure member 39 is adapted to sealingly secure the threaded aperture 37. In the embodiment of FIG. 1, the closure member 39 is a plug. When closed by closure member 39, the receptacle 31 will not be used.

The closure member 39 may also be a prior art leak detector (not shown). The leak detector fits within the receptacle 31 and has threads that secure to the threaded aperture 37. The leak detector monitors pressure in the outlet chamber 27. It will deactivate the pump 15 from operating if the pressure drops below a selected minimum when the pump is not running.

In this invention, a diverter 41 is provided for use with the control housing 19. Diverter 41 is installed by removing the closure member 39, whether the closure member 39 is a plug, or a leak detector. The diverter 41 has a cylindrical body 43. The lower section 45 of the body will locate in the receptacle 31. An o-ring seal 47 will seal the lower section 45 of body 43 to the receptacle 31. The body 43 has a flat bottom 49 that faces downward and is in communication with the flow line 33.

Threads 51 are located on the sidewall of the body above the lower section 45. Threads 51 will secure the body 43 to the threaded aperture 37. Once installed, the diverter 41 separates the outlet chamber 27 into an upstream portion and a downstream portion. The downstream portion is the portion below bottom 49 and in communication with flow line passage 33. The upstream portion is the portion from check valve 29 to the receptacle 31.

Diverter 41 has an upstream diverting passage 53. Upstream diverting passage 53 has an inlet 55 that communicates with the upstream portion of the outlet chamber 27. Inlet 55 is located on the sidewall of the body 43 above the lower section 45 and below the threads 51. The upstream diverting passage 53 leads upward to a coupling 57.

Coupling 57 is secured to the upper end of body 43. Coupling 57 is a tubular member with a passage that continues the upstream diverting passage 53. The upper end of coupling 57 connects to a valve block 59. Valve block 59 has a U-shaped passage 61 leading from the bottom upward, over, then back out on the bottom again.

An upstream pressure gage 63 connects to the passage 61. A manual valve 65 will open and close the passage 61. Valve 65 is located in the uppermost portion of the passage 61. A handle 67 will open and close valve 65. The passage 61 leads through another coupling 69 back to the body 43. A downstream pressure gage 71 connects into the passage 61 downstream of valve 65. The coupling 69 leads to a downstream diverting passage 73. Downstream diverting passage 73 extends straight downward to an outlet 75 on bottom 49. Outlet 75 communicates with the flow line 33.

In operation, if a leak is suspected, the operator will remove the closure member 39 and insert the diverter 41, shown in FIG. 2. He will open valve 65. The operator will then actuate pump 15 to apply normal pressure to the system. Fuel will be pressurized through the conduit 17, inlet chamber 23, outlet chamber 27 and flow line 33. Fuel pressure will also be in the diverting passages 53, 61 and 73. Typically the system will now have about 30 PSI of pressure.

The operator will close the valve 65 and then shut off pump 15. Check valve 29 will close if it is working properly. Closing valve 65 isolates pressure in the outlet chamber 27 and passage 53 from the pressure in the flow line 33 and passage 73.

The operator will monitor the pressure on the gages 63, 71. The pressure will drop normally to about 6 to 12 PSI on the upstream pressure gage 63. The drop occurs due to normal operation of the check valve 29. If the level is below 6 PSI, that indicates that a leak exists in the control housing 19. The downstream pressure gage 71 should remain steady at the same pressure that existed when pump 15 was running, normally 30 PSI. If the pressure drops, that indicates that a leak exists in the flow line 33. The operator then will continue to check out the system on the leaking side of valve 65 to determine the source of the leak. Once the leak is repaired, the diverter 41 may be removed from the control housing 19 and the closure member 39 replaced.

The invention has significant advantages. The valve isolates one-half of the system from the other. This simplifies diagnosing the source of leaks in the fuel dispensing system. The device is easily installed and adaptable with conventional equipment.

While the invention has been shown in only one of its forms, it should be apparent to those skilled in the art that it is not so limited, but is susceptible to various changes without departing from the scope of the invention.

We claim:

1. A method of detecting leakage in a liquid dispensing system which pumps the liquid from an underground tank, through a conduit to a control housing having an inlet chamber and an outlet chamber separated by a check valve, and from the outlet chamber to a flow line leading to a surface mounted dispenser, the method comprising in combination:

inserting a diverter into the outlet chamber to separate the outlet chamber into an upstream portion in communication with the check valve and a downstream portion in communication with the flow line;

providing the diverter with a diverting passage leading from the upstream portion of the outlet chamber to the downstream portion of the outlet chamber;

mounting a valve into the diverting passage to selectively open and close pressure from the upstream portion of the outlet chamber from pressure in the downstream portion of the outlet chamber;

mounting an upstream pressure gage to the diverting passage upstream of the valve and a downstream pressure gage to the diverting passage downstream of the valve; then actuating the pump while the valve is open to apply pressure to the inlet chamber, both portions of the outlet chamber and the flow line; then closing the valve, turning off the pump and monitoring the pressure in the upstream portion of the outlet chamber with the upstream pressure gage, and monitoring the pressure in the flow line with the downstream pressure gage.

2. An apparatus for detecting leakage in a pump system for pumping a liquid from an underground tank through a conduit to a control housing having an inlet chamber and an outlet chamber separated by a check valve, the outlet chamber of the pump system being connected to a flow line leading to a surface mounted dispenser, the outlet chamber having a receptacle, the apparatus comprising in combination:

a diverter having a body with a lower section adapted to fit within the receptacle;

seal means on the lower section of the body for sealing the body in the receptacle, dividing the outlet chamber into an upstream portion in communication with the check valve and a downstream portion in communication with the flow line;

a diverting passage in the body of the diverter, leading from an inlet to an outlet, the inlet communicating with the upstream portion of the outlet chamber when the diverter is in the receptacle, the outlet communicating with the flow line when the diverter is in the receptacle;

a valve in the diverting passage between the inlet and the outlet;

an upstream pressure gage mounted to the diverting passage upstream of the valve; and a downstream pressure gage mounted to the diverting passage downstream of the valve;

whereby closing the valve after the system is pressurized by the pump will isolate the check valve and upstream portion of the chamber from the flow line, enabling the pressure in the upstream portion of the chamber to be monitored and the pressure in the flow line to be monitored independently of each other.

3. The apparatus according to claim 2 wherein the lower section of the body has a cylindrical side wall and a bottom, and wherein the inlet of the diverting passage is on the side wall and the outlet is on the bottom.

4. The apparatus according to claim 2 wherein the diverter further comprises:

a valve block mounted above the body by couplings, the diverting passage extending through the couplings and into and out of the valve block, the valve and pressure gages being mounted to the valve block.

5. The apparatus according to claim 2 wherein the housing has a set of threads located above the receptacle, and wherein the body has a set of threads that secure to the threads in the housing to secure the diverter to the housing.

6. The apparatus according to claim 2 wherein:

the receptacle is cylindrical, with the downstream portion of the outlet chamber located below the seat and the upstream portion of the outlet chamber being located above the seat; wherein the lower section of the body has a cylindrical side wall for reception in the seat and a bottom; and wherein the inlet of the diverting passage is on the side wall and the outlet is on the bottom.

7. An apparatus for detecting leakage in a pump system for pumping a liquid from an underground tank through a conduit to a control housing having an inlet chamber and an outlet chamber separated by a check valve, the outlet chamber of the pump system being connected to a flow line leading to a surface mounted dispenser, the outlet chamber having a cylindrical receptacle with a vertical axis, the flow line leading downward from the receptacle, the housing having a threaded aperture located above the receptacle, the aperture being normally closed by a closure member, the apparatus comprising in combination:

a diverter having a body with a lower section having a cylindrical side wall adapted to fit within the receptacle when the closure member is removed;

a set of threads on the body for securing the body to the threaded aperture;

a seal on the side wall of the body for sealing the body in the receptacle, dividing the outlet chamber into an upstream portion in communication with the check valve and a downstream portion in communication with the flow line;

a diverting passage in the body of the diverter, leading from an inlet on the side wall to an outlet on the bottom, the inlet communicating with the upstream portion of the outlet chamber when the diverter is in the receptacle, the outlet communicating with the flow line when the diverter is in the receptacle;

a valve in the diverting passage between the inlet and the outlet;

an upstream pressure gage mounted to the diverting passage upstream of the valve; and a downstream pressure gage mounted to the diverting passage downstream of the valve;

whereby closing the valve after the system is pressurized by the pump will isolate the check valve and upstream portion of the chamber from the flow line, enabling the pressure in the upstream portion of the chamber to be monitored and the pressure in the flow line to be monitored independently of each other.

8. The apparatus according to claim 7 wherein the diverter further comprises:

a valve block mounted above the body by couplings, the diverting passage extending through the couplings and into and out of the valve block, the valve and pressure gages being mounted to the valve block.

* * * * *